United States Patent [19]
Hatamura et al.

[11] Patent Number: 4,649,871
[45] Date of Patent: Mar. 17, 1987

[54] INTAKE SYSTEM FOR V-TYPE ENGINE

[75] Inventors: Koichi Hatamura; Tetsuo Hiraoka; Koji Asanomi, all of Hiroshima, Japan

[73] Assignee: Mazda Motor Corporation, Japan

[21] Appl. No.: 712,132

[22] Filed: Mar. 15, 1985

[30] Foreign Application Priority Data

Mar. 22, 1984 [JP] Japan .................................. 59-55116
Mar. 22, 1984 [JP] Japan .................................. 59-55117
Mar. 22, 1984 [JP] Japan .................................. 59-55118

[51] Int. Cl.$^4$ ............................................. F02B 75/22
[52] U.S. Cl. ............................ 123/52 MV; 123/52 MC
[58] Field of Search ......... 123/52 M, 52 MC, 52 MV

[56] References Cited

U.S. PATENT DOCUMENTS

| | | | |
|---|---|---|---|
| 2,845,911 | 8/1958 | Gill | 123/52 MV |
| 2,845,912 | 8/1958 | Bird, Jr. | 123/52 MV |
| 2,857,893 | 10/1958 | Lobdell | 123/52 MV |
| 2,909,165 | 10/1959 | Dolza | 123/52 MV |
| 2,947,294 | 8/1960 | Bird et al. | 123/52 MV |
| 3,303,832 | 2/1967 | Platner et al. | 123/52 M |
| 4,425,881 | 1/1984 | Lyndhurst | 123/52 MV |

Primary Examiner—Craig R. Feinberg
Attorney, Agent, or Firm—Gerald J. Ferguson, Jr.; Michael P. Hoffman; Ronni S. Malamud

[57] ABSTRACT

An intake system for a V-type engine comprises a surge tank, a common intake pipe upstream of the surge tank and a plurality of discrete intake pipes for connecting the respective cylinders in the cylinder banks of the V-type engine with the surge tank. Each of the discrete intake pipes for the cylinders in each cylinder bank comprises a U-shaped bight portion which projects from the side of the surge tank remote from the cylinder bank toward the other cylinder bank and is bent toward the cylinder bank, and a crossing portion which is connected between the corresponding intake port in the cylinder bank and the downstream end of the U-shaped bight portion and crosses the discrete intake pipes for the cylinders in the other cylinder bank below the surge tank.

22 Claims, 8 Drawing Figures

INTAKE SYSTEM FOR V-TYPE ENGINE

BACKGROUND OF THE INVENTION

1. Field of the Invention

This invention relates to an intake system for a V-type engine, and more particularly to an intake system for a V-type engine having a surge tank midway between the two banks thereof.

2. Description of the Prior Art

In a V-type engine having a pair of cylinder banks set at an angle to each other, intake pipes connected to the respective cylinders in the two cylinder banks are generally converged to the middle of the space between the cylinder banks to form a common intake passage, as disclosed in Japanese Unexamined Utility Model Publication No. 58(1983)-154860.

However, when the converging portion of the intake passages (surge tank) is disposed midway between the cylinder banks, there arises a problem with the length of the intake pipes downstream of the surge tank. That is, in order to make the length of each intake pipe downstream of the surge tank sufficient to obtain so-called intake inertia supercharging effect in a low-to-middle speed operating region of the engine, the surge tank must be positioned high so that the distance between the surge tank and the intake port of each cylinder is extended, which results in increased overall hegiht of the engine.

SUMMARY OF THE INVENTION

In view of the foregoing observations and description, the primary object of the present invention is to provide an intake system for a V-type engine in which the length of the intake passage of each cylinder downstream of the surge tank can be made sufficient to obtain increased engine output power by so-called intake inertia supercharging effect without substantially increasing the overall height of the engine.

In accordance with the present invention, the intake passages for the cylinders in each cylinder bank first project from the side of the surge tank remote from the cylinder bank toward the other cylinder bank and then are bent toward the cylinder bank so that the intake passages for both the cyoinder banks cross each other below the surge tank. That is, each intake passage for the cylinders in each cylinder bank comprises a U-shaped bight portion which projects from the side of the surge tank remote from the cylinder bank toward the other cylinder bank and is bent toward the cylinder bank, and a crossing portion which is connected between the corresponding intake port in the cylinder bank and the downstream end of the U-shaped bight portion and crosses the intake passages for the cylinders in the other cylinder bank below the surge tank.

In one preferred embodiment of the present invention, the U-shaped bight portion of each intake passage extends to above the other cylinder bank in order to further elongate the length of each intake passage without increasing the overall height of the engine.

In another preferred embodiment of the present invention, the U-shaped bight portion of each intake passage is inclined with respect to the vertical in the direction of the output shaft of the engine in order to further elongate the length of each intake passage without increasing the overall height of the engine and the intake resistance.

In still another preferred embodiment of the present invention, the internal space of the surge tank is divided into a pair of compartments by a partition extending in the longitudinal direction of the surge tank so that the intake passages for the cylinders in the respective cylinder banks are connected to different compartments which are substantially operatively independent from each other. This arrangement contributes to improvement in the engine output power by providing so-called resonant effect upstream of the surge tank.

DESCRIPTION OF THE PREFERRED EMBODIMENTS

Figure 1:
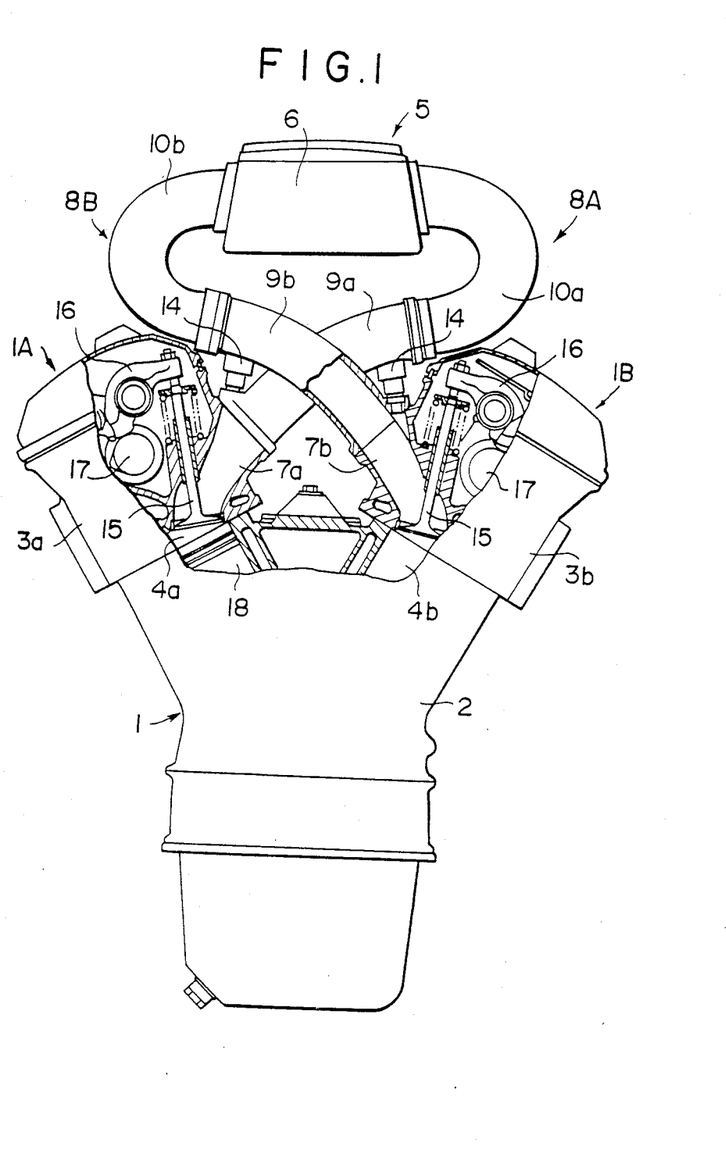
FIG. 1 is a front elevational view partly in cross section of a V-6 engine having an intake system in accordance with a first embodiment of the present invention.
Figure 2:
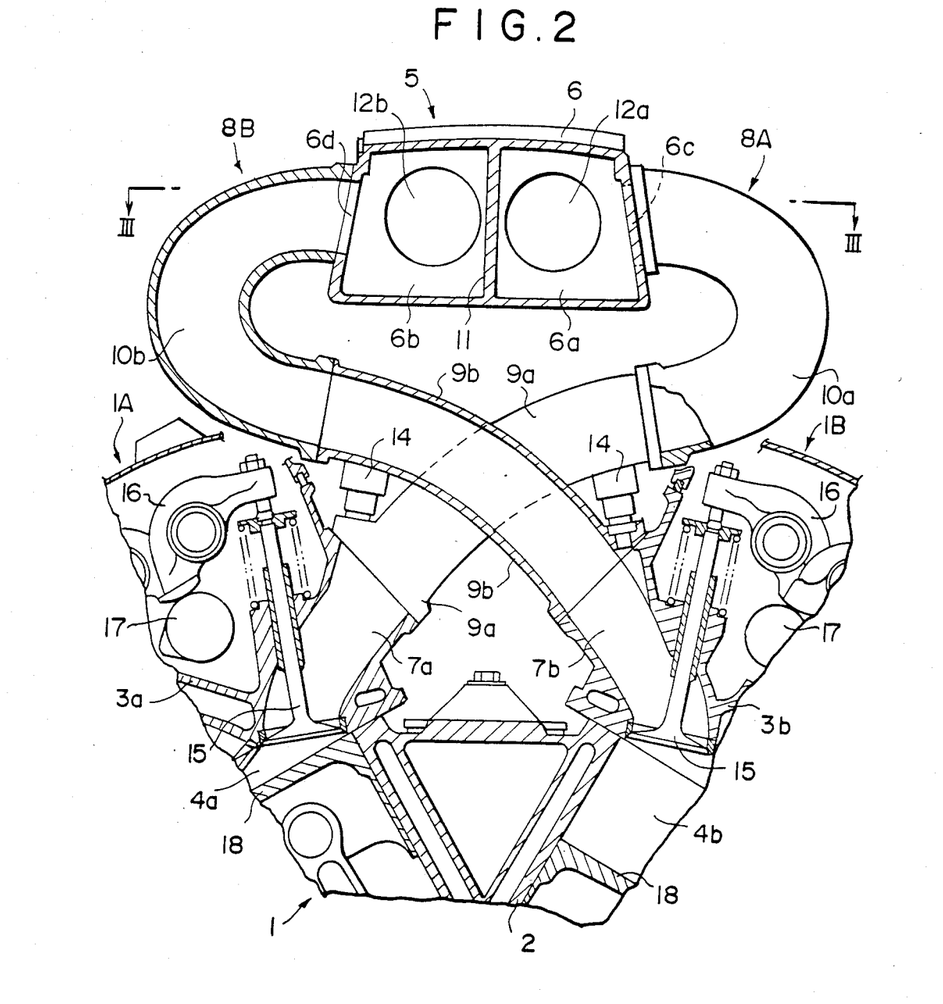
FIG. 2 is a fragmentary cross-sectional view of the V-6 engine.
Figure 3:
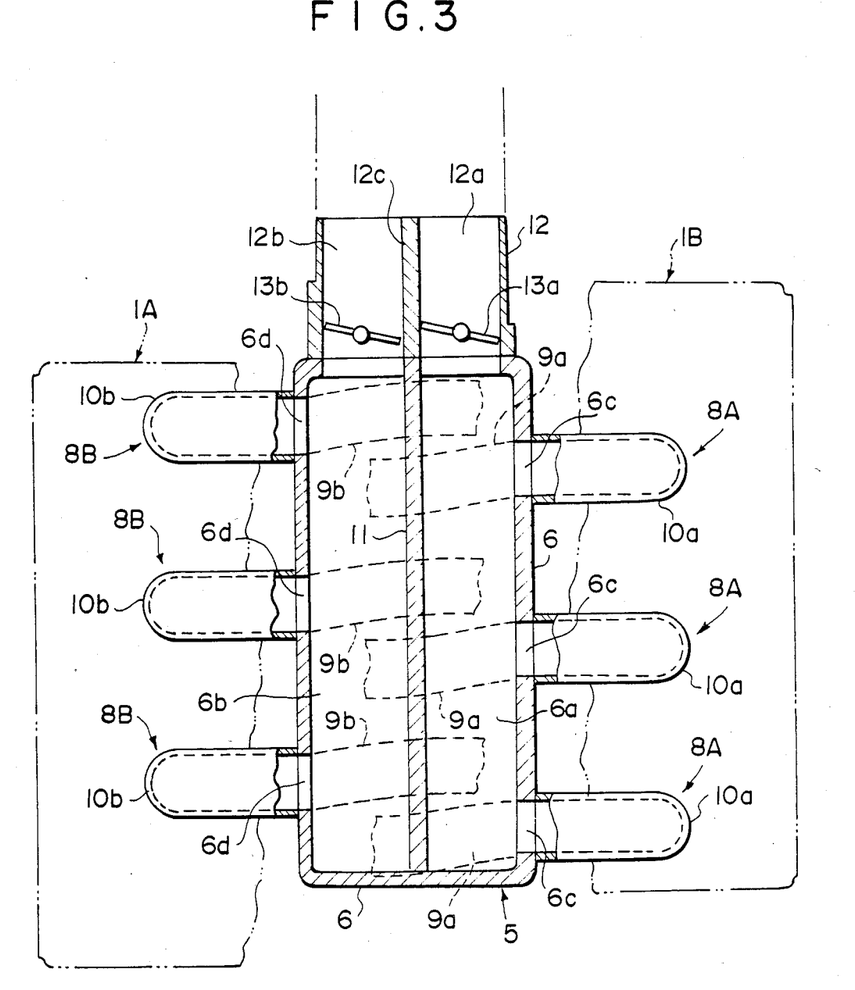
FIG. 3 is a cross-sectional view taken along line III—III in FIG. 2.

In FIGS. 1 to 3, a V-6 engine 1 having an intake system in accordance with a first embodiment of the present invention comprises a cylinder block 2 and first and second cylinder heads 3a and 3b mounted on the cylinder block 2 at an angle to each other. First and second cylinder banks 1A and 1B respectively having three cylinders 4a and three cylinders 4b are thus formed. The V-6 engine 1 is provided with an intake system 5 having a surge tank 6 disposed midway between the first and second cylinder banks 1A and 1B and higher than the cylinder banks 1A and 1B. Each intake port 7a in the first cylinder bank 1A is connected with the surge tank 6 by way of a first intake pipe 8A and each intake port 7b in the second cylinder bank 1B is connected with the surge tank 6 by way of a second intake pipe 8B. Each intake pipe 8A connecting the intake port 7a in the first cylinder bank 1A projects from the side of the surge tank 6 remote from the first cylinder bank 1A toward the second cylinder bank 1B and is bent toward the first cylinder bank 1A above the second cylinder bank 1B to extend substantially straight to the corresponding intake port 7a. Similarly, each intake pipe 8B connecting the intake port 7b in the second cylinder bank 1B projects from the side of the surge tank 6 remote from the second cylinder bank 1B toward the first cylinder bank 1A and is bent toward the second cylinder bank 1B above the first cylinder bank 1A to extend substantially straight to the corresponding intake port 7b. The first intake pipes 8A and the second intake pipes 8B cross each other at their straight portions below the surge tank 6. That is, each first intake pipe 8A comprises a U-shaped bight portion 10a projecting from the side of the surge tank 6 remote from the first cylinder bank 1A, and a crossing portion 9a which is substantially straight and is connected between the downstream end of the U-shaped bight portion 10a and the intake port 7a, and each second intake pipe 8B comprises a U-shaped bight portion 10b projecting from the side of the surge tank 6 remote from the second cylinder bank 1B, and a crossing portion 9b which is substantially straight and is connected between the downstream end of the U-shaped bight portion 10b and the intake port 7b.

Generally, the crossing portions 9a of the three first intake pipes 8A for the three cylinders 4a in the first cylinder bank 1A and the crossing portions 9b of the three intake pipes 8B for the three cylinders 4b in the second cylinder bank 1B are formed integrally with each other, while the U-shaped bight portions 10a and 10b are formed as discrete members. This arrangement is advantageous in that mounting of the crossing portions 9a and 9b, the surge tank 6 and the bight portions 10a and 10b is facilitated, and that auxiliary components mounted between the cylinder banks 1A and 1B such as the fuel injection valves 14 and the fuel distributor (not shown) become easy of access. Further, the U-shaped bight portion 10a (10b) is preferably mounted on the surge tank 6 and the crossing portions 9a (9b) by way of a pair of mounting flanges formed on the respective ends of the bight portions 10a (10b) to be positioned substantially on one plane, thereby facilitating manufacture of the bight portion and assembly and disassembly of the bight portion. Each U-shaped bight portion can be replaced with one having a different length.

The internal space of the surge tank 6 is divided into first and second compartments 6a and 6b isolated from each other by a partition wall 11 extending in the longitudinal direction of the vehicle body or parallel to the output shaft of the engine. In the right side wall of the surge tank 6 or the side wall remote from the first cylinder bank 1A are formed three communicating holes 6c opening into the first compartment 6a, and in the left side wall of the surge tank 6 or the side wall remote from the second cylinder bank 1B are formed three communicating holes 6d opening into the second compartment 6b. Each first intake pipe 8A is communicated with the first compartment 6a by way of one of the communicating holes 6c and each second intake pipe 8B is communicated with the second compartment 6b by way of one of the communicating holes 6d.

The first and second compartments 6a and 6b of the surge tank 6 are communicated with the atmosphere by way of a common intake pipe, an upstream intake pipe 12 mounted on an open end of the surge tank 6. The upstream intake pipe 12 is provided with a partition wall 12c which forms an extension of the partition wall 11 in the surge tank 6 and defines two independent (first and second) passages 12a and 12b respectively communicated with the first and second compartments 6a and 6b in the surge tank 6. First and second throttle valves 13a and 13b are positioned in the first and second passages 12a and 12b, respectively, and are synchronized with each other to be opened and closed by the same angle.

In each crossing portion 9a, 9b of each intake pipe 8A, 8B downstream of the surge tank 6 is provided a fuel injection nozzle 14 for injecting fuel into the intake port 7a or 7b. The upper portions of the fuel injection valves 14 in the crossing portions for each cylinder bank are positioned beside the crossing portions for the other cylinder bank. This arrangement is advantageous in that the spaces between the crossing portions 9a and 9b can be effectively utilized. In FIGS. 1 and 2, reference numerals 15 to 18 respectively denote an intake valve, a rocker arm, a camshaft and a piston.

In this embodiment, intake air is introduced into each cylinder 4a, 4b through the passage 12a, 12b of the upstream intake pipe 12, the compartment 6a, 6b of the surge tank 6, the U-shaped bight portion 10a, 10b of the intake pipe 8A, 8B, the crossing portion 9a, 9b and the intake port 7a, 7b. By forming each intake pipe downstream of the surge tank 6 with the bight portion and the crossing portion, the effective length of each intake pipe can be elongated without substantially raising the position of the surge tank 6, whereby a compact V-type engine in which a desirable intake inertia supercharging effect can be obtained in the low-to-middle speed (2,500 to 5,000 rpm) operating region can be realized.

In the first embodiment shown in FIGS. 1 to 3, the internal space of the surge tank 6 is divided into two compartments 6a and 6b by the partition wall 11. This arrangement is advantageous in that intake air interference can be suppressed and a supercharging effect can be obtained by virtue of pressure vibration due to the influence of the intake pipe 12 upstream of the surge tank 6, whereby engine output can be improved especially in the low speed operating region of the engine. Further, though in the first embodiment of the present invention, the crossing portions 9a, 9b and the U-shaped bight portions 10a, 10b are separately formed, they may be formed integrally, if desired. Further, as clearly shown in FIGS. 1 and 2, the bight portions 10a and 10b extend above the respective cylinder banks 1B and 1A. This arrangement is advantageous in further elongating the effective intake passage downstream of the surge tank 6 without increasing the overall height of the engine.

Figure 4:
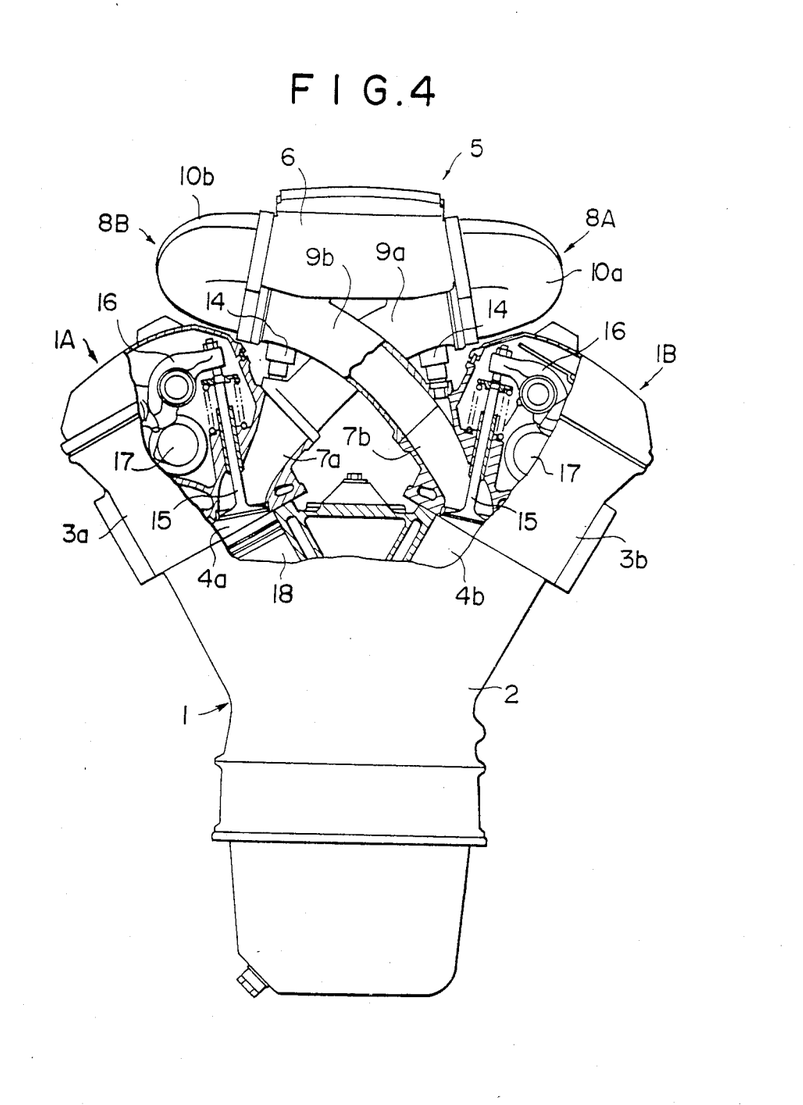
FIG. 4 is a front elevational view partly in cross section of a V-6 engine having an intake system in accordance with a second embodiment of the present invention.
Figure 5:
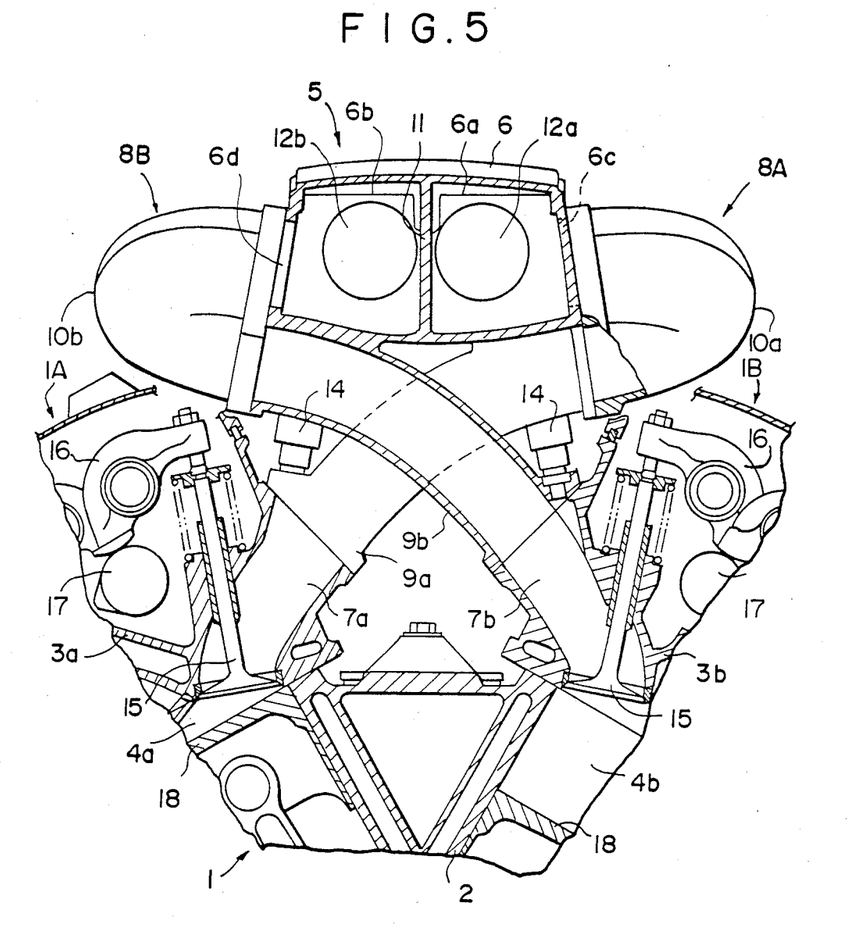
FIG. 5 is a fragmentary cross-sectional view of the V-6 engine of FIG. 4.

FIGS. 4 and 5 show another V-6 engine having an intake system in accordance with a second embobiment of the present invention. The intake system of the second embodiment is substantially the same as that of the first embodiment. Therefore, the parts corresponding to the parts of the first embodiment are given the same reference numerals and only the difference between the first and second embodiments will be described hereinbelow.

In the intake system of the first embodiment, the crossing portions 9a of the first intake pipes 8A and the crossing portions 9b of the second intake pipes 8B are integrally formed with each other but are separately formed from the surge tank 6. On the other hand, in the intake system of the second embodiment, the crossing portions 9a and 9b are integrally formed with each other and at the same time are integrally formed with the surge tank 6. That is, the upper portion of the crossing portions 9a and 9b is integrally formed with the surge tank 6 so that the bottom wall of the surge tank 6 defines the upper wall portion of each crossing portion as clearly shown in FIG. 5. This arrangement is advantageous in that the overall weight of the crossing portions 9a and 9b and the surge tank 6 can be reduced, and a larger volume of the surge tank 6 can be obtained for a given height of the engine or a lower engine height can be obtained for a given volume of the surge tank 6.

As in the first embodiment, each U-shaped bight portion can be replaced with one having a different length. By changing the length of the U-shaped portion, the engine rpm at which the natural frequency of the intake system is tuned with the frequency of the pressure change in the intake passage can be changed. As is well known, by tuning the natural frequency of the intake system with the frequency of pressure change in the intake passage at a given engine rpm, the intake inertia supercharging effect can be enhanced at the given engine rpm to improve the engine output power. Further, the U-shaped bight portions may be formed of a material different from the material of the crossing portions and the surge tank.

Figure 6:
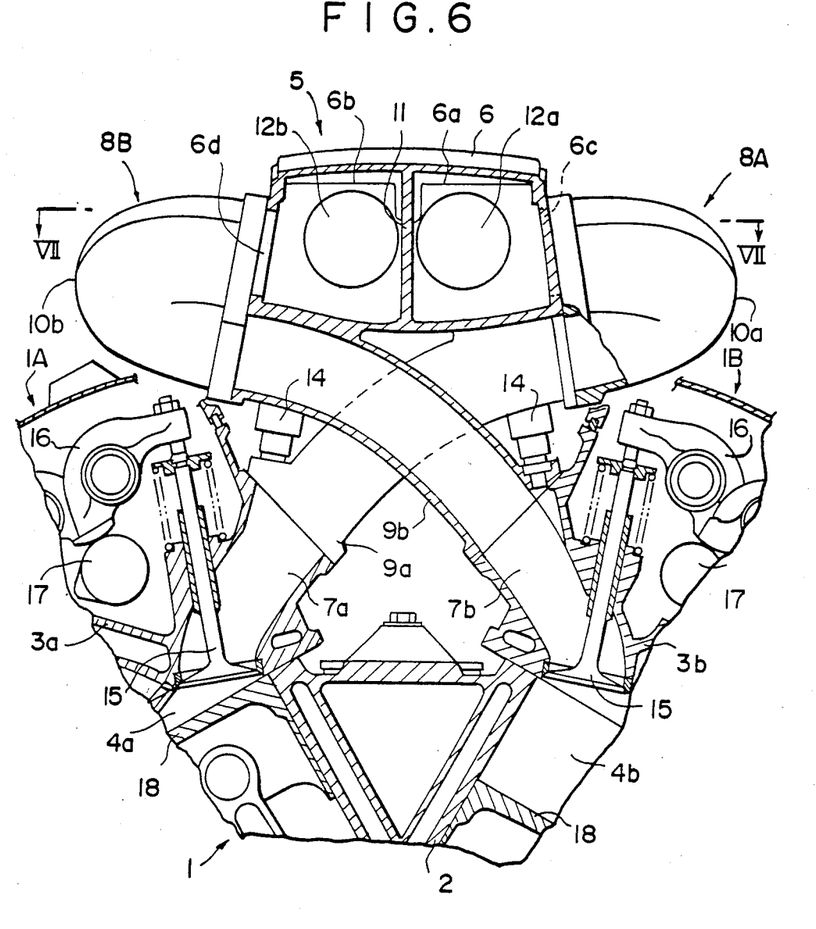
FIG. 6 is a fragmentary cross sectional view of a V-6 engine having an intake system in accordance with a third embodiment of the present invention.
Figure 7:
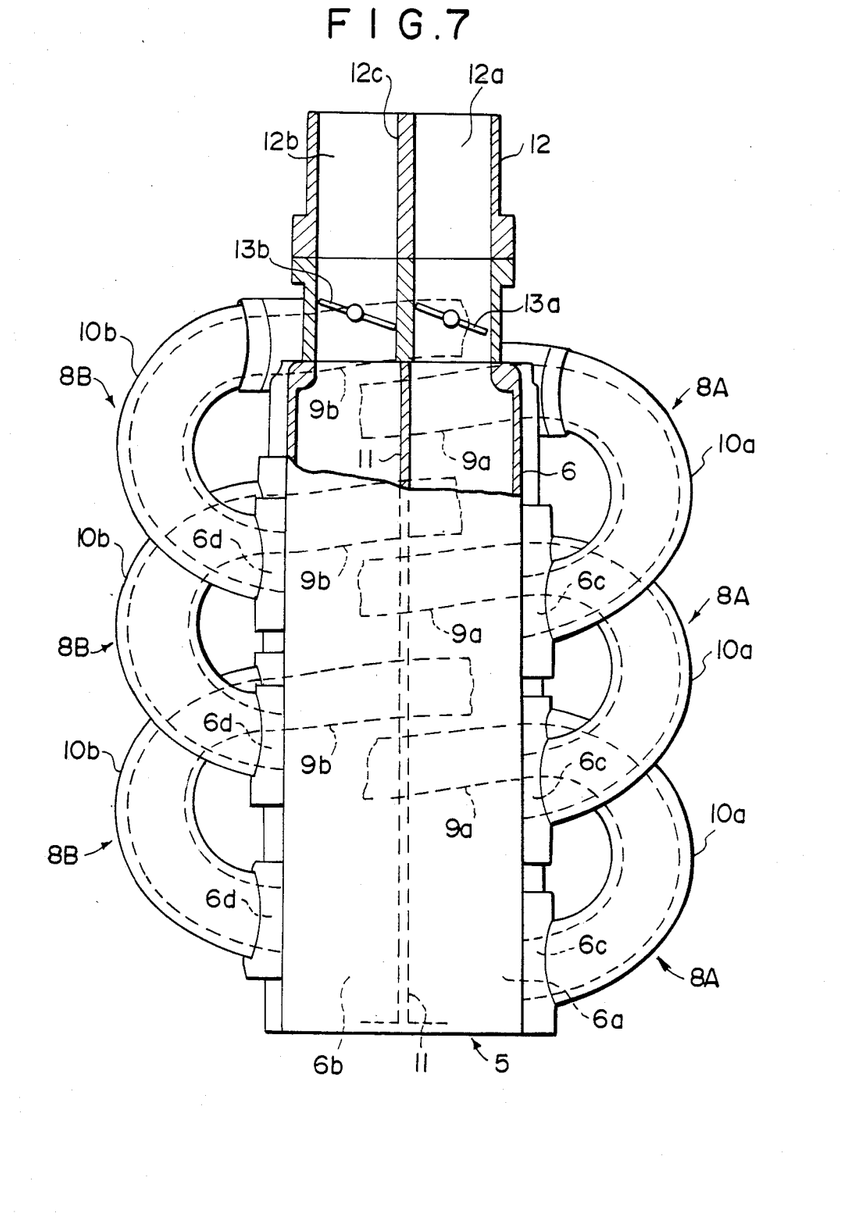
FIG. 7 is a cross-sectional view taken along line VII—VII in FIG. 6.
Figure 8:
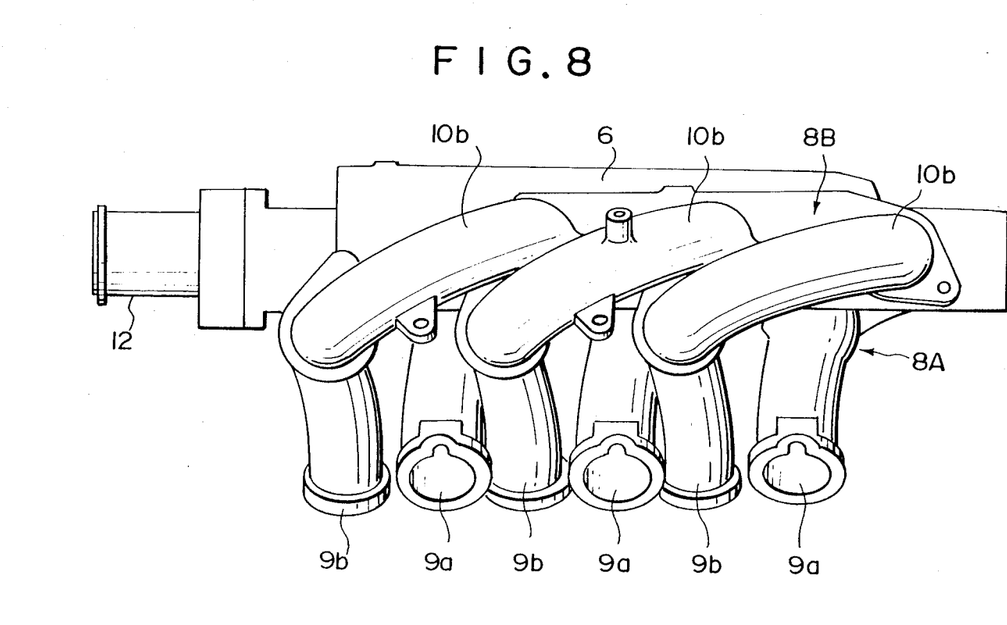
FIG. 8 is a left side view of FIG. 7.

FIGS. 6 to 8 show still another V-6 engine having an intake system in accordance with a third embodiment of the present invention. The intake system of the third embodiment is substantially the same as those of the first and second embodiments. Therefore, the parts corresponding to the parts of the first or second embodiment are given the same reference numerals and the difference between the third embodiment and the fiist and second embodiments will be mainly described hereinbelow.

Though in the first and second embodiments, each intake pipe 8A, 8B having the U-shaped bight portion 10a, 10b and the crossing portion 9a, 9b extends substantially in a vertical plane, in the third embodiments, each U-shaped bight portion 10a, 10b is inclined with respect to the vertical in the direction of the output shaft of the engine. That is, the surge tank 6 is positioned forwardly displaced with respect to the first and second cylinder banks 1A and 1B in the third embodiment and accordingly each U-shaped bight portion 10a, 10b is inclined forwardly from the junction between the crossing portion 9a, 9b and the bight portion 10a, 10b. As in the second embodiment, the upper portion of the crossing portions 9a and 9b is integrally formed with the surge tank 6 so that the bottom wall of the surge tank 6 defines the upper wall portion of each crossing portion as clearly shown in FIG. 6.

The arrangement of the third embodiment in which the bight portions are inclined with respect to the vertical in the direction of the output shaft of the engine is advantageous over those of the first and second embodiments in that the length of each intake pipe 8A, 8B can be made longer for a given height of the surge tank 6 and the radius of curvature can be made larger for a given height of the surge tank 6, thereby reducing the intake resistance.

Though in the third embodiment, only the bight portion 10a, 10b is inclined, also the crossing portion 9a, 9b may be inclined with respect to the vertical. Further, the first intake pipes 8A and the second intake pipes 8B may be inclined in opposite directions.

We claim:

1. An intake system for a V-type engine having a pair of cylinder banks set at an angle to each other on opposite sides of an output shaft having a predetermined direction,
    a plurality of intake ports opening in inner wall portions of the respective cylinder banks and communicating one with each cylinder in the cylinder bank,
    the intake system comprising a surge tank defining an internal space disposed substantially midway between the cylinder banks,
    a common intake passage communicating the internal space of the surge tank atmosphere,
    and a plurality of discrete intake passages, each communicating the internal space of the surge tank with one of the cylinders by way of the intake port communicating therewith,
    characterized in that said surge tank has upper and lower walls extending in a direction parallel to the output shaft of the engine, and side walls connecting with the upper and lower walls and extending in a direction parallel to the output shaft of the engine,
    and each of said discrete intake passages for the cylinders in each cylinder bank comprises a U-shaped bight portion which laterally projects from each of said side walls of the surge tank above a top portion of a cylinder head of the cylinder bank adjacent thereto and extends to the cylinder bank remote from said respective side wall having a corresponding one of said intake ports so as to extend away from said adjcent cylinder bank and is downwardly bent toward said remote cylinder bank,
    and a crossing portion which is connected between the corresponding intake port in the remote cylinder bank and the downstream end of the U-shaped bight portion and crosses the discrete intake passages for the cylinders in the adjacent cylinder bank below the surge tank.

2. An intake system for a V-type engine as defined in claim 1 in which a fuel injection valve is provided in each crossing portion below the surge tank.

3. An intake system for a V-type engine as defined in claim 1 in which said U-shaped bight portions are inclined in the direction of the output shaft of the engine with respect to a vertical plane along the output shaft.

4. An intake system for a V-type engine as defined in claim 1 in which the internal space of said surge tank is divided into a pair of compartments by a partition disposed between the opposed side walls, said compartments being connected to the cylinders in the respective cylinder banks by way of the discrete intake passages, and said common intake passage is communicated with the internal space of both the compartments by way of at least one opening formed in one end wall of the surge tank.

5. An intake system for a V-type engine as defined in claim 4 in which said partition extends from said one end wall to an opposite end wall, and said common intake passage is communicated with both the compartments respectively by way of a pair of openings in said one end wall to open to the respective compartments.

6. An intake system for a V-type engine as defined in claim 5 in which said common intake passage is divided into two branch passages at least in the portion near the surge tank, each branch passage being communicated with one of the openings in the one end wall of the surge tank, and a throttle valve being provided in each branch passage.

7. An intake system for a V-type engine as defined in claim 1 in which said U-shaped bight portions of the discrete intake passages for each cylinder bank extend to reach above the other cylinder bank.

8. An intake system for a V-type engine as defined in claim 7 in which said U-shaped bight portions are inclined with respect to a vertical plane in the direction of the output shaft of the engine.

9. An intake system for a V-type engine as defined in claim 8 in which a plurality of cylinders are provided in each cylinder bank and said U-shaped bight portions of the discrete intake passages projecting from each side of the surge tank open to the side of the surge tank at locations arranged in a line substantially parallel to the ouput shaft of the engine, the U-shaped bight portions being inclined in the direction of the output shaft by a substantially equal angle.

10. An intake system for a V-type engine as defined in claim 9 in which a fuel injection valve is provided in each crossing portion near a downstream end thereof, an upper portion of the fuel injection valves in the crossing portions for each cylinder bank being positioned beside the crossing portion for the other cylinder bank.

11. An intake system for a V-type engine as defined in claim 7 in which said U-shaped bight portions are separately formed from the crossing portions and the surge tank.

12. An intake system for a V-type engine as defined in claim 11 in which said crossing portions and the surge tank are integrally formed.

13. An intake system for a V-type engine as defined in claim 11 in which each U-shaped bight portion is provided with a pair of mounting flanges at ends thereof, one for mounting the upstream end of the bight portion on the surge tank and the other for mounting the downstream end of the same on an upstream end of the crossing portion, the mounting flanges being positioned substantially on one plane.

14. An intake system for a V-type engine having a pair of cylinder banks set at an angle to each other on opposite sides of an output shaft having a predetermined direction, a plurality of intake ports opening in inner wall portions of the respective cylinder banks and communiating one with each cylinder in the cylinder bank, the intake system comprising a surge tank defining an internal space disposed substantially midway between the cylinder banks, a common intake passage communicating the internal space of the surge tank with atmosphere, and a plurality of discrete intake passages each communicating the internal space of the surge tank with one of the cylinders by way of the intake port communicating therewith, characterized in that each of said discrete intake passages for the cylinders in each cylinder bank comprises a U-shaped bight portion which extends from opposite side walls of the surge tank above a top portion of a cylinder head of the cylinder bank adjacent there and is downwardly bent toward the cylinder bank remote from said respective side wall, and a crossing portion which is connected between the corresponding intake port in the remote cylinder bank and the downstream end of the U-shaped bight portion and crosses the discrete intake passages for the cylinders in the adjacent cylinder bank below the surge tank, the U-shaped bight portions of the discrete intake passages for each cylinder bank extending above the adjacent the cyliner bank.

15. An intake system for a V-type engine as defined in claim 14 in which said U-shaped bight portions are inclined with respect to a vertical plane in the direction of the output shaft of the engine.

16. An intake system for a V-type engine as defined in claim 15 in which a plurality of cylinders are provided in each cylinder bank and the U-shaped bight portions are inclined in the direction of the output shaft by a substantially equal angle.

17. An intake system for a V-type engine as defined in claim 14 in which each U-shaped bight portion is a tubular member separately formed from the surge tank.

18. An intake system for a V-type engine as defined in claim 17 in which each U-shaped bight portion is provided with a pair of mounting flanges at ends thereof, one for mounting the upstream end of the bight portion on the surge tank and the other for mounting the downstream end of the same on an upstream end of the crossing portion, the mounting flanges being positioned substantially on one plane.

19. An intake system for a V-type engine having a pair of cylinder banks set at an angle to each other on opposite sides of an output shaft having a predetermined direction, a plurality of intake ports opening in inner wall portions of the respective cylinder banks and communicating one with each cylinder in the cylinder bank, the intake system comprising a surge tank defining an internal space disposed substantially midway between the cylinder banks, a common intake passage communicating the internal space of the surge tank with atmosphere, and a plurality of discrete intake passages each communicating the internal space of the surge tank with one of the cylinders by way of the intake port communicating therewith, characterized in that each of said discrete intake passages for the cylinders in each cylinder bank comprises a U-shaped bight portion which extends from opposed side walls of said surge tank above a top portion of a cylinder head of the cylinder bank adjacent thereto and is bent toward the cylinder bank remote from said respective side wall, and a crossing portion which is downwardly connected between the corresponding intake port in the remote cylinder bank and a downstream end of the U-shaped bight portion and crosses the discrete intake passages for the cylinders in the adjacent cylinder bank below the surge tank, an upstream end of each U-shaped bight portion being shifted from the downstream end of the U-shaped bight portion toward one side in the direction of the output shaft of the engine.

20. An intake system for a V-type engine as defined in claim 19 in which said surge tank is an elongated box-like member having said opposed side walls extending in the direction of the output shaft of the engine and the internal space of the surge tank is divided into a pair of compartments by a partition disposed between the opposed side walls, said compartments being connected to the cylinders in the respective cylinder banks by way of the discrete intake passages, said common intake passage being communicated with the internal space of both the compartments by way of at least one opening formed in one end wall of the surge tank.

21. An intake system for a V-type engine as defined in claim 20 in which said partition extends from said one end wall to an opposite end wall, and said common intake passage is communicated with both the compartments respectively by way of a pair of openings formed in said one end wall to open to the respective compartments.

22. An intake system for a V-type engine as defined in claim 21 in which said common intake passage is divided into two branch passages at least in the portion near the surge tank, each branch passage being communicated with one of the openings in the one end wall of the surge tank, and a throttle valve being provided in each branch passage.

* * * * *